United States Patent Office 3,180,853
Patented Apr. 27, 1965

3,180,853
POLYURETHANE PREPOLYMER CHAIN-EXTENDED WITH AN N-LOWER ALKYL AMINO-BIS-LOWER ALKYL AMINE
Timothy V. Peters, Jr., Barrington, R.I., assignor to E. I. du Pont de Nemours and Company, Wilmington, Del., a corporation of Delaware
No Drawing. Filed Apr. 6, 1961, Ser. No. 101,046
10 Claims. (Cl. 260—77.5)

This invention relates to a novel polyurethane polymer which has improved dyeability and dye retention, to porous and nonporous shaped structures or articles made therefrom, and to such articles after having been colored with an acid dye.

The elastomeric polymer formed by chain-extending the reaction product of a polyalkyleneether glycol and an organic diisocyanate with hydrazine exemplifies a class of polyurethane polymers which is known to have outstanding utility in the manufacture of shaped structures or articles such as micorporous coatings, nonporous films and textile fibers. But the poor dyeability and capacity for dye retention of these chain-extended elastomeric polyurethanes when preferred types of light-stable acid dyes are employed in the dye bath has placed a definite limitation on their usefulness for colored products.

For example, vapor permeable sheet materials having comfort and durability properties similar to those of the most widely used grades of shoe-upper leather have been made by applying to a suitable fabric a microporous coating of the above-mentioned elastomeric polyurethane chain-extended with hydrazine. However, until the present invention there has not been an entirely satisfactory method of making the microporous coating in a color having good depth, uniformity, washfastness and lightfastness. When dyed in an acid dye bath containing, for example, a chromed monoazo dye, the initial color might be fair in depth but often tends to be spotty. Moreover, much of the color is removed in the scouring step that normally follows. If the scouring step is omitted, the color fades substantially when the coating is subjected to washing with plain or soapy water and when exposed to sunlight.

Some improvement in resistance to fading on exposure to water or light has been obtained by blending various additives with the chain-extended elastomer, for example, polymeric aliphatic amines. But even the best of such additives have been characterized by one or more of the following drawbacks: (a) The final product has inferior physical properties. (b) Difficulties are encountered with preferred film-forming and micropore-forming techniques. (c) The desired degree of washfastness is still not attained because the additive is not inert to water. (d) The additive is too expensive to be practical for use in highly competitive products.

It is therefore the primary object of this invention to provide a new polyurethane polymer having improved dyeability and dye retention.

A more specific object is the provision of a chain-extended polyurethane elastomer which is capable of being formed into articles such as microporous coatings, nonporous films and textile fibers and subsequently dyed with acid dyes to deep colors having improved resistance to fading when the articles are washed in water.

Another object is to provide dyed articles of a chain-extended polyurethane elastomer having improved retention of color after scouring, washing and exposure to sunlight.

Other important objects will be apparent from the description of the invention which follows.

The novel polyurethane polymer of this invention, in broad terms, is the product formed by reacting an organic diisocyanate with an active hydrogen containing polymeric material such as a polyalkyleneether glycol or a hydroxyl-terminated polyester to produce an isocyanate-terminated polyurethane prepolymer, and reacting the resulting prepolymer with a chain extender comprising N-methyl-amino-bis-propylamine or another compound having the formula

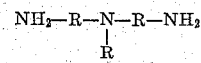

wherein R is a $C_1$–$C_4$ saturated aliphatic group.

The polymer just described will hereafter occasionally be referred to as "the novel polymer."

A vapor premeable sheet material having leather-like comfort and durability properties, deep color, and characterized by excellent retention of color when scoured, washed and exposed to sunlight can be made from the novel polymer by (1) applying to a woven or nonwoven fabric or other porous, fibrous, flexible substrate (e.g., paper or leather) a layer of polymeric solution comprising the novel polyurethane polymer and an organic solvent therefor which is miscible with an inert liquid (e.g., water, glycerol, ethylene glycol, ethanol, or glycol monoethyl ether), (2) bathing the layer of polymeric solution with said inert liquid to coagulate it, to convert it to a gelatinous polymeric layer having a cellular structure of intercommunicating micropores, and to remove most or all of the organic solvent therefrom, (3) dyeing the bathed layer in a dye bath containing a chromed monoazo dye or another acid dye, and (4) drying the resulting dyed vapor permeable sheet material.

Other shaped structures or articles, such as nonporous films and textile fibers can also be made from the novel polyurethane polymer and successfully dyed with an acid dye.

The novel polyurethane polymer of this invention can be prepared by first mixing a molar excess of an organic diisocyanate with an active hydrogen containing polymeric material in the form of a polyalkyleneether glycol or a hydroxyl-terminated polyester and heating the mixture at about 50 to 120° C. until a polyurethane prepolymer is formed having terminal —NCO (isocyanate) groups. Alternatively, the diisocyanate can be reacted with a molar excess of the active hydrogen containing polymeric material, and the reaction product capped by reacting it with more diisocyanate to form the prepolymer.

Aromatic, aliphatic and cycloaliphatic diisocyanates or mixtures thereof can be used in forming the prepolymer. Such diisocyanates are, for example, tolylene-2,4-diisocyanate, tolylene-2,6-diisocyanate, m-phenylene diisocyanate, biphenylene 4,4'-diisocyanate, methylene bis-(4-phenyl isocyanate), 4-chloro-1,3-phenylene diisocyanate, naphthalene-1,5-diisocyanate, tetramethylene-1,4-diisocyanate, hexamethylene-1,6-diisocyanate, decamethylene - 1,10 - diisocyanate, cyclohexylene-1,4-diisocyanate, methylene bis(4-cyclohexyl isocyanate) and tetrahydronaphthalene diisocyanate. Arylene diisocyanates, that is, isocyanates in which the isocyanate groups are attached to an aromatic ring are preferred. In general they react more readily than do alkylene diisocyanates.

A polyalkyleneether glycol is the preferred active hydrogen containing polymeric material for the prepolymer formation. The most useful polyglycols have a molecular weight of 300 to 5000, preferably 400 to 2000, and include, for example, polyethyleneether glycol, polypropyleneether glycol, polytetramethyleneether glycol, polyhexamethyleneether glycol, polyoctamethyleneether glycol, polynonamethyleneether glycol, polydecamethyleneether glycol, polydodecamethyleneether glycol and mixtures thereof. Polyglycols containing several different radicals in the molecular chain such as, for example, the compound HO(CH$_2$OC$_2$H$_4$O)$_n$H wherein $n$ is an integer greater than 1 can also be used.

Polyesters which can be used instead of or in conjunction with the polyalkyleneether glycols are, for example, those formed by reacting acids, esters or acid halides with glycols. Suitable glycols are polymethylene glycols, such as ethylene, propylene, tetramethylene, decamethylene glycol, substituted polymethylene glycols such as 2,2-dimethyl-1,3-propanediol, cyclic glycols such as cyclohexanediol, and aromatic glycols such as xylylene glycol. Aliphatic glycols are generally preferred when maximum product flexibility is desired and when making microporous articles. These glycols are reacted with aliphatic, cycloaliphatic or aromatic dicarboxylic acids or lower alkyl esters or ester forming derivatives thereof to produce relatively low molecular weight polymers, preferably having a melting point of less than about 70° C., and molecular weights like those indicated for the polyalkyleneether glycols. Acids for preparing such polyesters are, for example, succinic, adipic, suberic, sebacic, terephthalic and hexahydroterephthalic acids and the alkyl and halogen substituted derivatives of these acids.

The isocyanate-terminated polyurethane prepolymer is reacted with a chain extender comprising a compound having the formula

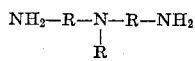

wherein R is a saturated aliphatic group containing 1-4 carbon atoms (i.e., a methyl, ethyl, propyl or butyl group). In the preferred compound, the R beneath the central N is methyl and the other two R's are propyl; thus, the preferred compound is N-methyl-amino-bis-propylamine.

The chain extender need not consist entirely of a compound having the formula shown above. In fact, it is usually best to use a blend of a minor proportion, preferably about 5-30 mole percent, of the essential compound described above with a major proportion, preferably about 95-70 mole percent, of another compound having two active hydrogen atoms bonded to amino-nitrogen atoms, preferably hydrazine. Other chain-extending compounds which can be used along with the essential compound are, for example, mono-substituted hydrazines, dimethyl-piperazine, 4-methyl-m-phenylene-diamine, m-phenylene-diamine, 4,4'-diamino-diphenyl-methane, 1,4-diamino-piperazine, ethylene diamine and mixtures thereof.

The novel polyurethane polymers made with a chain-extender containing more than about 5 mole percent of the essential compound generally show the greatest improvement in dye retention and dyeability. More than about 20-30 mole percent of the essential chain extender produces relatively little additional improvement in depth and retention of color and is generally not preferred for economic reasons. Best results are obtained in most applications with about 10-30 mole percent of the essential chain extender; this is particularly true when the polymer is to be used in the manufacture of microporous sheet materials by methods involving inert-liquid-treatment of a solution of the polymer, for example as illustrated below in Example 4.

During the chain-extension reaction, prepolymer molecules are joined together into a substantially linear polyurethane polymer, the molecular weight of which is usually at least 5000 and sometimes as high as 300,000. Since the polymer has rubber-like resilience and extensibility, it is referred to as an "elastomer," although these properties may vary widely from product to product depending on the chemical structure of the polymer and the materials in combination with it.

Shaped structures or articles can be formed from the polymer, or blends thereof with other polymers and various additives, by known methods. For example, it can be formed into textile fibers by the known methods of forming spandex fibers. Or into nonporous films or sheets by such known methods as pressing, calendering and solution-casting. Or into molded articles by pressing or casting in a suitable mold. Or into macroporous or microporous coatings, films, sheets or molded articles by methods known to be capable of providing porosity in such articles of chain-extended polyurethanes. Known pore-forming methods include: punching the article with needles in a needle-loom; dispersing soluble particles in the article and later removing them with a solvent; dispersing liquid-swollen particles in the article and later baking the article to shrink the particles; dispersing a chemical blowing agent in the article and later heating to activate the blowing agent.

The novel polymer and articles containing it can be colored with surprising success by immersion in, or contact with, a dye bath which contains an acid dye. The dye can be any acid dye; for example, it can be the type known by dye chemists to be useful for coloring wool or nylon in a neutral to weakly acidic (e.g., pH of about 4.0 to 6.8) aqueous dye bath, or it can be a direct cotton color type of acid dye. Metallized monoazo dyes, for example, chromed monoazo dyes, are especially useful. Best results are usually obtained with a half-chromed monoazo dye—that is, containing one chromium atom in association with 2 molecules of azo compound. Good results are also obtained with a full-chromed monoazo dye.

Further improvement in the ability of the dyed articles to retain their color on extended exposure to sunlight can be achieved by incorporating therein one or more additives known to be useful for this purpose, such as certain polymeric aliphatic amines, certain pigments (e.g., carbon black or titanium dioxide), ultraviolet screening agents (e.g., substituted benzephenones), and antioxidants (e.g., certain substituted phenolic compounds).

Unexpectedly, the novel polyurethane polymer of this invention exhibits greatly improved colorability with acid dyes, and greatly improved retention of color when scoured, washed and exposed to sunlight. The polymer is capable of being formed into durable, colored microporous coatings and other shaped structures or articles by some of the most efficient and economical methods known.

The following examples are given for the purpose of illustrating the invention; all quantities shown are on a weight basis unless otherwise indicated.

*Example 1*

This example illustrates the preparation of a clear, nonporous film of the novel polymer, and subsequently coloring the film with an acid dye.

A 20% solution of polyurethane elastomer is prepared by first mixing 3343 parts of polytetramethyleneether glycol of about 1000 molecular weight with 291 parts of tolylene-2,4-diisocyanate and heating the mixture for 3 hours at 90° C. Then 2485 parts of the resulting hydroxyl-end-group-containing dimer are mixed with 570 parts of methylene-bis-(4-phenyl-isocyanate). This mixture is heated for one hour at 80° C., yielding a prepolymer with isocyanate end groups. The prepolymer is dissolved in 10,000 parts of N,N-dimethyl formamide (sometimes referred to simply as dimethylformamide), and the resulting solution is added slowly to a solution consisting of 50 parts of chain extender dissolved in 1,710 parts of dimethyl formamide. The chain extender consists of N-methyl-amino-bis-propylamine and hydrazine hydrate in a molar ratio of 40-60. The resulting reaction mixture is stirred at 40° C. for 30 minutes to form a polyurethane solution having a viscosity of about 115 poises and a polymer content of about 20%.

A layer of the elastomer solution is cast on a glass plate in sufficient thickness to form a 20 mil film when dry. Drying is accomplished by placing the cast layer in an oven heated to 100° C. for 1½ hours. Finally, the film is cooled and removed from the plate.

A sample piece of the clear film is immersed for 30 minutes in a boiling aqueous dye bath containing 5% of a red acid dye and 5% of oxalic acid, the percentages being based on the weight of the film sample. The weight of sample: weight of dye bath ratio is 1:40. The dye is the chromed monoazo red dye disclosed in Example 10 of French Patent 942,500; it is prepared by diazotizing 2-amino-phenol-4-sulfonamide, coupling the diazotized intermediate with 1,3-isoquinoline-diol, and metallizing the coupled material with chromium.

Next, the film is scoured for 15 minutes in a boiling aqueous scouring bath containing 0.3% of a nonionic detergent based on the weight of the water. The film: bath weight ratio again is 1:40. The detergent is the condensation product of reacting 20 moles of ethylene oxide with 1 mole of a C–18 alcohol.

The dye and scoured film product has a deep and uniform red color. It has general utility as a tough, extensible, flexible, nonporous, colored polymeric film, for example in packaging, upholstery, trim, baby pants, rubber bands and protective coverings.

A control sample for purposes of comparison is prepared by repeating the procedure of Example 1 with the single exception that the chain extender used in making the polymer consists entirely of hydrazine hydrate. When the control sample is removed from the scouring bath which follows dyeing, it is not red at all—instead, it has a pale amber color.

*Example 2*

A black polyurethane film having properties and utility similar to the product of Example 1 is prepared by repeating the procedure of Example 1 with the single exception that the dye in the dye bath is the chromed monoazo black dye identified as C.I. 15711 (Colour Index number) in "Colour Index," second edition, volume 3, copyright 1957, in the U.S. by the American Association of Textile Chemists and Colorants.

When the product of this example is subjected to 5 successive scouring cycles, or a total scouring time of 75 minutes, using a fresh bath for each cycle, it retains substantially all of its original deep black color. On the other hand, a control sample made with hydrazine as the sole chain extender loses substantially all of its black color in a single scouring cycle. Thus, the surprisingly superior washfastness of the dyed product made with the novel polymer is apparent.

Similar results to those of Example 2 are obtained when N-butylamino-bis-propylamine or N-methylamino-bis-ethylamine is substituted for the N-methyl-amino-bis-propylamine portion of the chain extender in Example 2.

*Example 3*

This example illustrates the application of a microporous coating of the novel polymer to a nonwoven fabric and subsequently coloring the coating with an acid dye to produce a vapor permeable leather-like sheet material having improved color characteristics.

A polymeric coating solution consisting of 10.5% of polyurethane elastomer, 5.7% polyvinyl chloride and 83.8% dimethyl formamide is prepared by admixing a 12% solution in dimethyl formamide of polyvinyl chloride with a suitable amount of the 20% polyurethane solution described in Example 1.

A layer of the coating solution is applied by means of a doctor knife to one side of a porous flexible nonwoven fabric to a wet-film thickness of about 65 mils. The nonwoven fabric weighs 6.5 ounces per square yard and is made by needle-punching and heat shrinking a batt of 0.5 denier retractable poly(ethylene-terephthalate) fibers followed by impregnation with about 35%, based on the batt's fiber content, of a hydrazine-extended polyurethane elastomer similar to the one used in the control sample immediately following Example 1. The preparation of the nonwoven fabric is described in greater detail in Example 1 of U.S. patent application S.N. 835,431, filed August 24, 1959, now U.S. Patent 3,067,483.

The coated fabric is immersed in water at room temperature for 2 hours. During this water-bathing step the layer of coating solution is coagulated, converted into a gelatinous polymeric layer having a cellular structure of intercommunicating micropores, and rendered substantially free of dimethyl formamide.

Next, the coated fabric is subjected to steam at 100° C. for 15 minutes, then dried in a 100° C. dry heat zone. When dry, the microporous polymeric coating is white in color, about 20 mils in thickness, and it is highly permeable to water vapor.

Samples of the resulting moisture-permeable sheet are dyed red and scoured in the same manner as was the product of Example 1. The samples have a deep red color after dyeing and after scouring. Additional samples are dyed black and scoured in the same manner as was the product of Example 2 with good retention of the black color not only after one scouring cycle but also after 5 scouring cycles. The moisture permeability of the dyed and scoured samples is substantially as great as it was prior to dyeing.

Control samples made with hydrazine as the sole chain extender in the elastomer and dyed in the same manner show a substantial loss of color in a single scouring cycle. Therefore, it is unexpectedly apparent that even microporous coatings made with the novel polymer have superior resistance to loss of color in aqueous washing media. The product is useful as a replacement for shoe-upper and garment leather.

*Example 4*

A vapor permeable leather-like sheet material having a deep and uniform brown color of good washfastness is prepared by repeating Example 3 except for the following differences:

(a) The chain extender used in making the polyurethane elastomer consists of a blend of N-methyl-amino-bis-propylamine and hydrazine hydrate in a molar ratio of 20:80.

(b) The polymeric coating solution, prior to its application to the fabric, is treated with an inert liquid, namely water, which is a nonsolvent for the polymeric component and is miscible with the dimethyl formamide component, in an amount sufficient to form a substantially colloidal opalescent polymeric dispersion. This is done by slowly adding while stirring 12.2 parts of a 1:4 blend of water and dimethylformamide with 60 parts of the coating solution.

(c) The moisture-permeable sheet is dyed in 40 times its own weight of an aqueous bath containing 5%, based on the weight of the sheet, of a chromium-azo compound produced in accordance with Example 1 of U.S. Patent 2,885,392. The dyeing procedure consists of heating the bath to 100° F., immersing the sheet, heating the bath to boiling temperature within a period of 15 minutes, boiling for 20 minutes, adjusting the bath to a pH of 5.0 with acetic acid, boiling for an additional 40 minutes, and removing the colored sheet from the bath.

(d) The nonionic detergent in the scouring bath is replaced with an anionic detergent which is the soduim salt of the sulfate of the condensation product of ethylene oxide and oleyl alcohol.

The product is useful as a shoe-upper material and as a general replacement for flexible grades of brown leather.

*Example 5*

A vapor permeable leather-like sheet material having properties and utility similar to the product of Example 4 is prepared by repeating Example 4 with the single exception that 1,4-diamino piperazine is used in place of the hydrazine component of the chain extender in making the polyurethane elastomer.

The product has excellent lightfastness as well as washfastness.

*Example 6*

The superior lightfastness and washfastness of microporous coatings made from the novel polymer and colored with an acid dye is further illustrated by repeating Example 4 except for the following differences:

(a) The moisture-permeable sheet material is dyed black instead of brown, using the dyeing method described in Example 2.

(b) One portion of the dyed sheet material is given 4 successive 5-minute washings in agitated water containing 0.5% of a detergent at 110° F., following by drying after each washing. The detergent is any common home washer type, such as "Vel." After this treatment, the product still has a deep black color.

(c) Another portion of the dyed sheet material is dried immediately upon being removed from the dye bath and subjected to light in an Atlas Fadeometer for 40 hours. After this exposure, the product still has a deep black color.

Control samples made by repeating Example 6 except for the use of hydrazine as the sole chain extender in preparing the elastomer were tested in the same manner. After testing, neither portion of the sheet is black although both portions were black when removed from the dye bath. The washed portion is light gray and the Fadeometer tested sample is a mottled greenish-gray.

*Example 7*

A brown vapor permeable leather-like sheet material having properties and utility similar to the product of Example 4 is produced by repeating Example 4 except that the polyurethane elastomer is a polyesterurethane instead of a polyetherurethane; it is prepared as follows:

292 parts (2 moles) of adipic acid are reacted with 260 parts (2.5 moles) of pentanediol-1,5 in the presence of toluene, a carrier for the water by-product, at a temperature of about from 135 to 200° C. for 8 hours. At the end of this period, the reaction pressure is reduced to 2 to 5 millimeters of mercury absolute and the reaction continued at 200 to 220° C. for one hour, after which time the remaining toluene is stripped from the reaction mixture. The resulting polyester has about 2.6% of hydroxyl groups, a melting point of 32° C. and a molecular weight on the order of 1300.

260 parts (0.2 mole) of the above polyester and 17.4 parts (0.1 mole) of tolylene-2,4-diisocyanate are heated for 3 hours at 90° C., then 52.5 parts (0.21 mole) of methylene bis(4-phenyl isocyanate) are reacted therewith for an additional one hour at 90° C. The resulting product is diluted with 1320 parts of N,N-dimethyl formamide, then further reacted with 6.5 parts of chain extender consisting of N-methylamino-bis-propylamine and hydrazine hydrate in a molar ratio of 20:80. A 20% solution of the resulting polymer in dimethylformamide has a viscosity of about 15 poises. The polymeric coating solution which results from blending this solution with a solution of polyvinyl chloride as described in Example 3 is prepared for the coating step by adding thereto, while stirring, a sufficient amount of a 1:4 blend of water and dimethylformamide to form a substantially colloidal opalescent polymeric dispersion—that is, just a few drops short of the amount that would gel the solution.

*Example 8*

This example illustrates the preparation of a yarn of the novel polymer, colored with an acid dye.

A 20% solution of polyurethane elastomer is prepared by first mixing 40 parts of polytetramethyleneether glycol of about 1000 molecular weight with 20 parts of methylene-bis(4-phenyl-isocyanate) and heating while stirring for one hour at 85° C. The resulting isocyanate-terminated prepolymer is dissolved in 100 parts of N,N-dimethylformamide and the solution cooled to 0° C. To the chilled solution is added 2 parts of chain extender dissolved in 50 parts of dimethylformamide. The chain extender consists of a blend of N-methyl-amino-bis-propylamine and hydrazine hydrate in a molar ratio of 25:75. The reaction mixture is stirred for 15 minutes while the container is kept in an ice bath. Sufficient dimethyl formamide is then added to provide a solution containing 20% of the resulting elastomer.

To 2500 parts of elastomer solution prepared in this manner is added 150 parts of 50% titanium dioxide slurry in dimethylformamide to complete the formation of the spinning composition.

The spinning composition is heated to 110° C. and extruded through a spinneret containing a plurality of holes to form 190 denier multifilament yarn. The yarn is passed through a column of air at 170–185° C. and wound up at the rate of 300 yards per minute.

The yarn is dyed a washfast red color by employing the dyeing procedure described in Example 1. Useful fabrics can be made from the yarn.

Similar results are obtained when the above example is repeated except that the 2 chain extender compounds are present in a molar ratio of 50:50.

I claim:

1. A linear polyurethane polymer, having a molecular weight of about 5000–300,000, formed by reacting an organic diisocyanate with an active hydrogen containing polymeric material selected from the group consisting of polyalkyleneether glycols and hydroxyl-terminated polyesters to produce an isocyanate-terminated polyurethane prepolymer, and reacting the resulting prepolymer by mixing with a chain extender consisting essentially of a compound having the formula

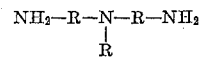

wherein R is a $C_1$–$C_4$ saturated aliphatic group.

2. A polymer as defined in claim 1 wherein said chain extender comprises N-methyl-amino-bis-propylamine.

3. A polymer as defined in claim 10 wherein the chain extender consists of N-methyl-amino-bis-propylamine and hydrazine.

4. A polymer as defined in claim 3 wherein the N-methyl-amino-bis-propylamine:hydrazine molar ratio is about from 5:95 to 50:50.

5. A nonporous film comprising a polymer as defined in claim 10.

6. A textile fiber comprising a polymer as defined in claim 10.

7. A vapor permeable sheet material comprising a microporous polymeric layer which comprises a polymer as defined in claim 10.

8. A vapor permeable sheet material comprising a microporous polymeric layer which comprises a polymer as defined in claim 4.

9. A product as defined in claim 8 wherein the microporous polymeric layer is in superposed adherence with a porous, fibrous, flexible substrate.

10. A linear polyurethane polymer, having a molecular weight of about 5000–300,000, formed by reacting an organic diisocyanate with an active hydrogen containing polymeric material selected from the group consisting of polyalkyleneether glycols and hydroxyl-terminated polyesters to produce an isocyanate terminated polyurethane prepolymer, and reacting the resulting prepolymer by mixing with a chain extender consisting essentially of at least 5 mol percent of an amine of the formula

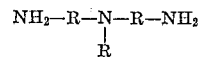

wherein R is a $C_1$–$C_4$ saturated aliphatic group and a compound having at least two amino nitrogen atoms each having at least one reactive hydrogen atom attached thereto.

References Cited by the Examiner
UNITED STATES PATENTS

| | | | |
|---|---|---|---|
| 2,829,984 | 4/58 | Yeager | 260—77.5 |
| 2,912,414 | 11/59 | Schultheis | 260—77.5 |
| 2,954,365 | 9/60 | Windemuth | 260—77.5 |

OTHER REFERENCES

Ser. No. 391,542, Mueller (A.P.C.), published Apr. 27, 1943.

LEON J. BERCOVITZ, *Primary Examiner.*

H. N. BURSTEIN, DONALD E. CZAJA, *Examiners.*